Feb. 2, 1932.   R. P. McNAUGHT   1,843,828

MEANS FOR KEEPING WINDOWS, WINDSHIELDS, ETC., CLEAR OF MOISTURE

Filed March 3, 1930

INVENTOR.
Robert P. McNaught
BY
Munn & Co.
ATTORNEYS.

Patented Feb. 2, 1932

1,843,828

UNITED STATES PATENT OFFICE

ROBERT PETER McNAUGHT, OF SAN FRANCISCO, CALIFORNIA

MEANS FOR KEEPING WINDOWS, WINDSHIELDS, ETC., CLEAR OF MOISTURE

Application filed March 3, 1930. Serial No. 432,948.

My invention relates to improvements in means for keeping windows, windshields, etc., clear of moisture, and it consists in the combinations, constructions and arrangements hereinafter described and claimed.

An object of my invention is to provide novel means for keeping a glass such as a windshield warm throughout its entire surface so as to prevent the condensation of moisture thereon. The warming means in the present instance consists of a fluid which does not interfere with the vision. If desired, the fluid may be colored slightly so as to cause the windshield to become anti-glare.

A further object of my invention is to provide a device of the type described which is extremely simple in construction and which is durable and efficient for the purpose intended.

Other objects and advantages of my invention will appear as the specification proceeds, and the novel features of the device will be particularly pointed out in the claims hereto annexed.

Figure 1:
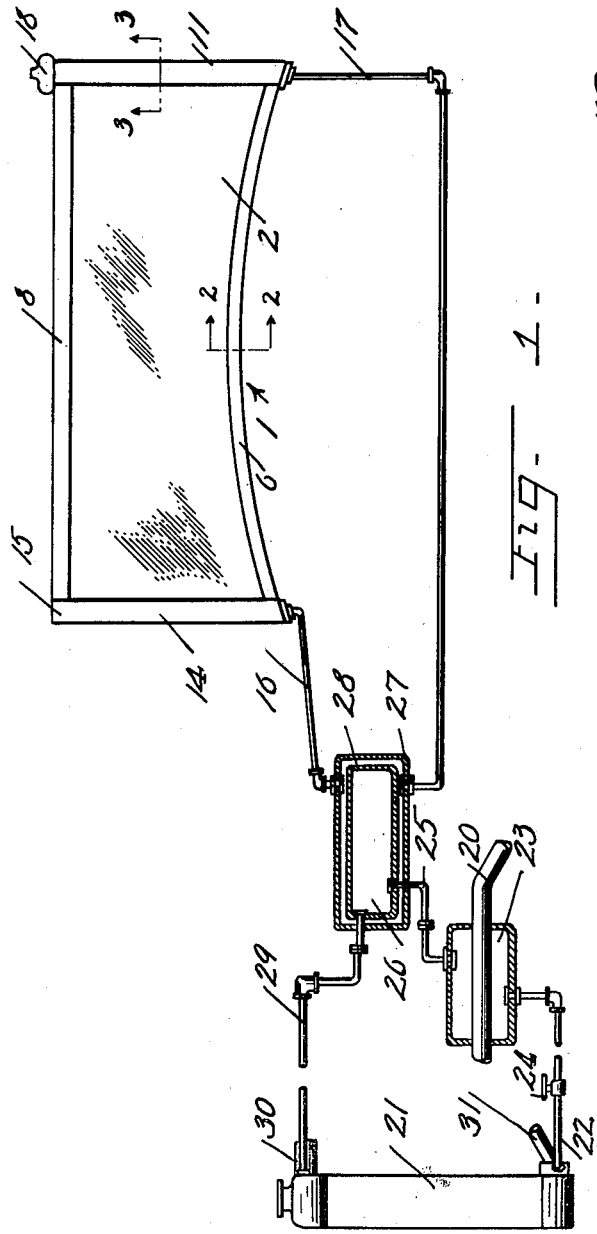
Figure 3:
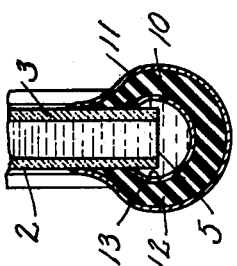
Figure 2:
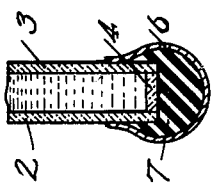

My invention is illustrated in the accompanying drawings, in which:

Figure 1 is a schematic showing of the entire invention,

Figures 2 and 3 are sections along the lines 2—2 and 3—3 of Figure 1, and

Figure 4:
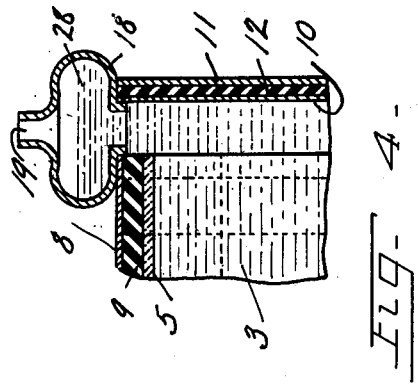

Figure 4 is a vertical section through a portion of the device.

In carrying out my invention I provide a windshield indicated generally at 1 and having two panes of glass 2 and 3 spaced from each other by glass strips 4 and 5, the strip 4 being disposed at the lower edges of the glasses 2 and 3, while the strip 5 is disposed at the upper edges. The side edges of the glasses 2 and 3 are not closed. This permits a fluid to enter one side of the windshield, to pass between the glasses, and to flow out from the other side.

I will first describe how the upper and lower edges of the windshield are sealed, and then will describe how the sides of the windshield are enclosed. Referring to Figure 2, it will be noted that a metal clip 6 encloses the lower edges of the window panes 2 and 3. Figure 1 shows this clip 6 as extending from end to end of the windshield. Within the clip I pour a composition of hot rubber and sulphur indicated at 7. When this composition cools it forms a perfect liquid seal for the lower edge of the windshield. It is obvious that any other suitable type of sealing means may be used without departing from the spirit and scope of my invention. The upper edges of the panes 2 and 3 are sealed together in like manner. In Figure 1 I have shown a strip 8 of metal which corresponds to the strip 6. Figure 4 shows how the strip or clamp 8 houses a sealing means 9 similar to the sealing means 7, and further shows how the window glass 3 is spaced from the glass 2 (not shown in Figure 4) by the strip 5.

The sides of the windshield are enclosed in the following manner: Figure 3 shows a metal clamping member 10 engaging with the side edges of the window panes 2 and 3. A second metal clamping member 11 encloses the first, and the space between the two is filled with a sealing means 12 similar to the sealing means 7. It will therefore be seen that a liquid passageway 13 is provided along the vertical edges of the panes 2 and 3. The same is true for the other vertical edge of the windshield. A metal clamp 14 is shown in Figure 1 which corresponds with the clamp 11 and which houses the sealing means and the inner clamp 10. Of course, the liquid passageway 13 enclosed by the clamp 14 is closed at its top end 15 but is open at its bottom end and is connected to a fluid conveying pipe 16. The fluid passageway 13 housed by the clamp 11 communicates at its lower end with a pipe 17 and is provided with a reservoir 18 at its upper end (see Figure 4), this reservoir having an opening 19 in its top.

I provide means for conveying a heated liquid to the windshield and for causing this liquid to flow from the left hand side of the windshield in Figure 1 to the right hand side and then to return to the heating means. Any suitable mechanism may be used for heating the liquid. In the present form of the invention I have shown the heat being furnished by the exhaust pipe 20 of an automobile.

An automobile radiator 21 is indicated generally in Figure 1, and a pipe 22 leads from the bottom of the radiator to a steam generator 23. A valve 24 controls the flow of water from the radiator into the steam generator. The exhaust pipe passes through the steam generator, and the heat of the exhaust gases passing through this pipe is sufficient to change the small amount of water entering the steam generator into steam. This steam will pass into a pipe 25 and into a steam chamber 26. The steam chamber 26 is jacketed by a liquid containing reservoir 27. The reservoir 27 is slightly larger than the chamber 26 so as to cause a thin layer of liquid to entirely enclose the chamber 26. In this way the heat within the chamber 26 is quickly transferred to the liquid 28 within the water jacket 27. Moreover, a rapid increase of heat of the liquid 28 will not cause an undue expansion of the liquid because of its small quantity.

The steam passes from the chamber 26 into a return pipe 29 that enters the radiator 21 at the top and above the water level. This prevents the water in the radiator from draining into the chamber 26. I have indicated the usual water pipes 30 and 31 leading from the radiator to the engine (not shown).

The heated liquid 28 will flow through the pipe 16 to the fluid passageway 13 in the member 14. From here the heated fluid will flow across the windshield and between the glasses 2 and 3 until it finally reaches the fluid passageway 13 in the member 11. By this time the fluid has become slightly cooled, and it will therefore pass through the pipe 17 back into the liquid compartment 27. Any increase or decrease in the volume of the liquid 28 due to the expansion and contraction from heat will cause the liquid to rise and fall in the reservoir 18. Should any gas bubbles develop, these will find their way to the reservoir and will escape through the opening 19. The heat of the liquid can be controlled by the valve 24 which in turn will control the amount of water entering the steam generator 23.

As stated in the first part of the specification, the liquid 28 may be colored so as to color the entire windshield without interfering with the vision. This color will stop the glare. Any type of liquid 28 may be used. I have found that water with 40% alcohol makes a liquid which is anti-freezing. If desired, the interior surface of the jacket 27 and the exterior surface of the chamber 26 may be tinned for aiding in transferring heat from the chamber 26 to the liquid 28. This tinning also prevents metallic oxides from forming which would cloud the fluid flowing to the windshield and staining the glass. All of the metal carriers for the liquid 28 should be tinned for the same reason.

From the foregoing description of the various parts of the device, the operation thereof may be readily understood.

In case of a foggy day, the driver can open the valve 24 to generate sufficient steam, and this steam will heat the liquid 28 which in turn will warm the windshield 1 to such an extent as to prevent the condensation of droplets on the windshield. This will keep the window clear without the need of squeegees. It is also obvious that the warm windshield will prevent the formation of frost and will have a tendency to evaporate the water striking the windshield when it is raining. One of the novel features of the invention lies in the fact that the entire windshield is thus kept clear.

Although I have shown and described one embodiment of my invention, it is to be understood that the same is susceptible of various changes, and I reserve the right to employ such changes as may come within the scope of the invention as claimed.

I claim:

1. The combination with a water radiator, a steam generator, means for conveying water from the radiator to the steam generator, a steam chamber communicating with the steam generator, a fluid jacketing the steam chamber and being warmed by the heat given off thereby, a windshield having spaced parallel transparent members, and means for conveying the fluid from around the steam chamber to the windshield and back again.

2. The combination with a water radiator, a steam generator, means for conveying water from the radiator to the steam generator, a steam chamber communicating with the steam generator, a fluid jacketing the steam chamber and being warmed by the heat given off thereby, a windshield having spaced parallel transparent members, means for conveying the fluid from around the steam chamber to the windshield and back again, and a reservoir for receiving a part of the fluid and for permitting its expansion and contraction, said reservoir having an open top.

3. The combination with a water radiator, a steam generator, an exhaust pipe passing therethrough, means for conveying water from the radiator to the steam generator, a steam chamber communicating with the steam generator, a fluid jacketing the steam chamber and being warmed by the heat given off thereby, a windshield having spaced parallel transparent members, and means for conveying the fluid from around the steam chamber to the windshield and back again.

4. The combination with a water radiator, a steam generator, means for conveying water from the radiator to the steam generator, a steam chamber communicating with the steam generator, a fluid jacketing the steam chamber and being warmed by the heat given off thereby, a windshield having spaced parallel transparent members, means for conveying the fluid from around the steam chamber to the windshield and back again, and a return pipe leading from the steam chamber to the radiator.

5. A window or windshield comprising two transparent members spaced apart, a channel opening into the space along one entire edge of the window, a second channel opening into the space along the opposite entire edge of the window, the other edges of the window being sealed together, an inlet pipe leading to the first channel, and an outlet pipe communicating with the second channel, and means for feeding a liquid to and from the window by passing it through the pipes, the liquid flowing uniformly from the first to the second channels and extending across the width of the window.

ROBERT PETER McNAUGHT.